(12) United States Patent
Taylor

(10) Patent No.: US 12,451,275 B2
(45) Date of Patent: Oct. 21, 2025

(54) GAS INSULATED SURGE ARRESTER AND A GAS INSULATED SURGE ARRESTER MONITORING SYSTEM

(71) Applicant: Hitachi Energy Ltd, Zürich (CH)

(72) Inventor: James Taylor, Ludvika (SE)

(73) Assignee: Hitachi Energy Ltd, Zürich (CH)

( * ) Notice: Subject to any disclaimer, the term of this patent is extended or adjusted under 35 U.S.C. 154(b) by 254 days.

(21) Appl. No.: 18/022,238

(22) PCT Filed: Aug. 25, 2020

(86) PCT No.: PCT/EP2020/073730
§ 371 (c)(1),
(2) Date: Feb. 20, 2023

(87) PCT Pub. No.: WO2022/042826
PCT Pub. Date: Mar. 3, 2022

(65) Prior Publication Data
US 2023/0326632 A1    Oct. 12, 2023

(51) Int. Cl.
*H01C 1/026* (2006.01)
*H01C 7/12* (2006.01)

(52) U.S. Cl.
CPC ............. *H01C 1/026* (2013.01); *H01C 7/126* (2013.01)

(58) Field of Classification Search
CPC ................................ H01C 1/026; H01C 7/126
See application file for complete search history.

(56) References Cited

U.S. PATENT DOCUMENTS

| 4,577,148 A | 3/1986 | Sweetana |
| 2011/0234243 A1* | 9/2011 | Santos ............... G01R 31/1227 324/659 |
| 2016/0238634 A1 | 8/2016 | Giovanelli |
| 2020/0303950 A1* | 9/2020 | Roberts ................ G08B 21/185 |

FOREIGN PATENT DOCUMENTS

| CN | 105137163 | * 12/2015 | ........... G01R 19/165 |
| CN | 106646062 A | 5/2017 | |
| CN | 106066437 B | 11/2018 | |
| EP | 2853903 A1 | 4/2015 | |
| EP | 3001430 | * 3/2016 | ............. H01C 7/126 |
| EP | 3422504 A1 | 1/2019 | |

(Continued)

OTHER PUBLICATIONS

RU-89792 translation (Year: 2009).*

(Continued)

*Primary Examiner* — Kyung S Lee
(74) *Attorney, Agent, or Firm* — Sage Patent Group

(57) ABSTRACT

A gas insulated surge arrester is disclosed, including a metal clad housing within which a block stack is arranged. The block stack includes at least one metal-oxide resistor column and the gas insulated surge arrester is characterized by a capacitive element arranged to obtain an electric field measurement of the gas insulated surge arrester; and by a bushing arranged through the metal clad housing and arranged to the provide a capacitive third-order harmonic current measurement to an input of a surge arrester monitoring device. A monitoring system is also provided, including a gas insulated surge arrester connected to a surge arrester monitoring device.

18 Claims, 2 Drawing Sheets

(56) References Cited

FOREIGN PATENT DOCUMENTS

| JP | S59128789 A | 7/1984 |
| JP | H112652 A | 1/1999 |
| JP | 2016080503 A | 5/2016 |
| KR | 20160057027 A | 5/2016 |
| RU | 2364879 C1 | 8/2009 |
| RU | 89792 | * 12/2009 |
| WO | WO-2020256221 | * 12/2020 ............ G01R 15/146 |

OTHER PUBLICATIONS

CN-105137163 translation (Year: 2015).*
EP-3001430 translation (Year: 2016).*
WO-2020256221 translation (Year: 2020).*
International Search Report and Written Opinion of the International Searching Authority, PCT/EP2020/073730, mailed Jun. 1, 2021, 14 pages.
Lee, B.H., et al., "A New On-Line Leakage Current Monitoring System Of ZnO Surge Arresters," Materials Science and Engineering, vol. 119, No. 1, May 15, 2005 (XP027792048) 6 pages.
LCM 500, Doble Lemke, Mar. 17, 2020, 1 page.
Rao, M. M., et al., "Development and Experimental Evaluation of Leakage Current Measurement Sensor for Electrical Power Apparatus," International Journal of Emerging Electric Power Systems, Jan. 17, 2018, De Gruyter, 11 pages.
P1-05 "Diagnostic Techniques for Surge Arresters With Main Reference to On-Line Measurement of Resistive Leakage Current of Metal-Oxide Arresters," Contribution for Panel on Modern Maintenance Techniques for enhancing the reliability of Insulation of Power Transmission Systems, Session 2000 © Cigre, 10 pages.
Office Action, Japanese Patent Application No. 2023-513498, mailed Jun. 11, 2024, 8 pages.
Chinese Office Action and English Translation, Application No. 202080103485.0, mailed Apr. 27, 2025, 22 pages.

* cited by examiner

GAS INSULATED SURGE ARRESTER AND A GAS INSULATED SURGE ARRESTER MONITORING SYSTEM

CROSS REFERENCE TO RELATED APPLICATIONS

This application is a 35 U.S.C. § 371 national stage application of PCT International Application No. PCT/EP2020/073730 filed on Aug. 25, 2020, the disclosure and content of which is incorporated by reference herein in its entirety.

TECHNICAL FIELD

The technology disclosed herein relates generally to the field of gas insulated surge arresters, and in particular to a gas insulated surge arrester for which condition monitoring is enabled, and a gas insulated surge arrester monitoring system.

BACKGROUND

A Gas Insulated Substation (GIS) is a metal encapsulated substation having a rather small footprint. It is therefore often used at places wherein space is limited, e.g., on offshore platforms or in city buildings. The GIS comprises high-voltage components such as surge arresters, circuit-breakers and disconnectors and uses a dielectric gas at moderate pressure for phase-to-phase and phase-to-ground insulation.

The GIS is impervious to and distinguished from the external ambiance, which is beneficial e.g., from an environmental viewpoint, but which also presents difficulties. A surge arrester in a GIS can be subjected to the same as or even harder operating duty than a surge arrester in an Air Insulated Substation (AIS). If deterioration occurs as a result, it is advantageous to detect it before it leads to a failure of the surge arrester and subsequent power outage. It is rather straightforward to perform meaningful in-service diagnostics on AIS arresters, and there are indeed products for such diagnostic purposes. In contrast, there are no such products for GIS surge arresters.

One difficulty is hence monitoring of the condition of GIS surge arresters. A known surge arrester diagnostic method, used for AIS, is a third harmonic analysis of the leakage current with compensation for harmonics in the voltage (International Standard, IEC 60099-5, method B2). It requires an input for the capacitive third harmonic current in the surge arrester in order to perform necessary compensation. This may be done with a field probe mounted at the base of the AIS surge arrester. However, this is not applicable for the GIS surge arrester since it is placed inside a metallic encapsulation filled with insulating gas. GIS surge arresters are therefore only monitored by traditional surge counters with surge recording and total leakage current measurement, which is not a meaningful diagnostic about the condition of the surge arrester as it only provides information on the surge arrester activity.

There is therefore a need for condition monitoring of GIS surge arresters.

SUMMARY

An objective of the present invention is to enable condition monitoring of GIS surge arresters.

This objective, as well as other, is according to an aspect, achieved by a gas insulated surge arrester. The gas insulated surge arrester comprises a metal clad housing within which a block stack is arranged. The block stack comprises at least one metal-oxide resistor column. The gas insulated surge arrester is characterized by a capacitive element that is arranged to obtain an electric field measurement of the gas insulated surge arrester, and by a bushing arranged through the metal clad housing. The bushing is arranged to provide a capacitive third-order harmonic current measurement to an input of a surge arrester monitoring device.

The gas insulated surge arrester brings about several advantages. For instance, the gas insulated surge arrester according to the invention may be adapted such that existing surge arrester monitoring devices may be used for its condition monitoring. The gas insulated surge arrester may be cost-efficient in that existing components may be used with added means for extracting a required measurement signal outside of the gas insulated surge arrester and enabling the use of existing surge arrester monitoring devices.

Historically, the ability to obtain meaningful diagnostic measurements from metal oxide resistor column(s) inside of a GIS surge arrester has been difficult and devices capable of evaluating them lacking. However, there has been reluctance to even consider making changes to existing GIS designs for the primary reason of concern regarding effect on reliability. The added cost has also been discouraging. There has thus been a long-felt need for improved meaningful condition monitoring of gas insulated surge arresters.

In order to improve GIS surge arrester monitoring, the present invention suggests a degree of redesign of the existing assembly and containment to incorporate new parts, possibly with some individual customization of the existing monitoring device. Through the combination of pre-existing and well-established parts, cost of the solution is minimized while obtaining the necessary functionality without negatively affecting overall reliability. The direct cost increase to the GIS surge arrester design as a whole, including monitoring system, is readily offset against the reduction in the significant cost that would otherwise result due to an unplanned outage because of a failed GIS surge arrester that was not being monitored.

In an embodiment, the capacitive element is arranged to extract a capacitive third-order harmonic component in a leakage current of the surge arrester.

In different embodiments, the capacitive element is a capacitive tap arranged to extract the capacitive third-order harmonic component in a leakage current of the surge arrester.

In a variation of the above embodiment, the bushing comprises a first side and a second side, one arranged to the capacitive element and another electrically connectable to the field probe input of the surge arrester monitoring device.

In some embodiments, the capacitive element comprises an internal capacitive element arranged within the metal clad housing. In other embodiments, the capacitive element comprises an external capacitive tap arranged on an outer side of the bushing.

In various embodiments, the capacitive element comprises a metallic plate. Such embodiments are highly cost-efficient and readily adaptable to the particular requirements at hand. In still other embodiments, various other sensor devices for measuring electric field may be used, for instance micro-electro-mechanical system (MEMS) sensors.

In various embodiments, an outer side of the bushing is electrically connected to the input of the surge arrester monitoring device by means of an electrical conductor.

The objective, as well as other, is according to another aspect achieved by a monitoring system comprising a gas insulated surge arrester according to any of the above embodiments, connected to a surge arrester monitoring device.

Further features and advantages of the present teachings will become clear upon reading the following description and the accompanying drawings.

DETAILED DESCRIPTION

Figure 1:
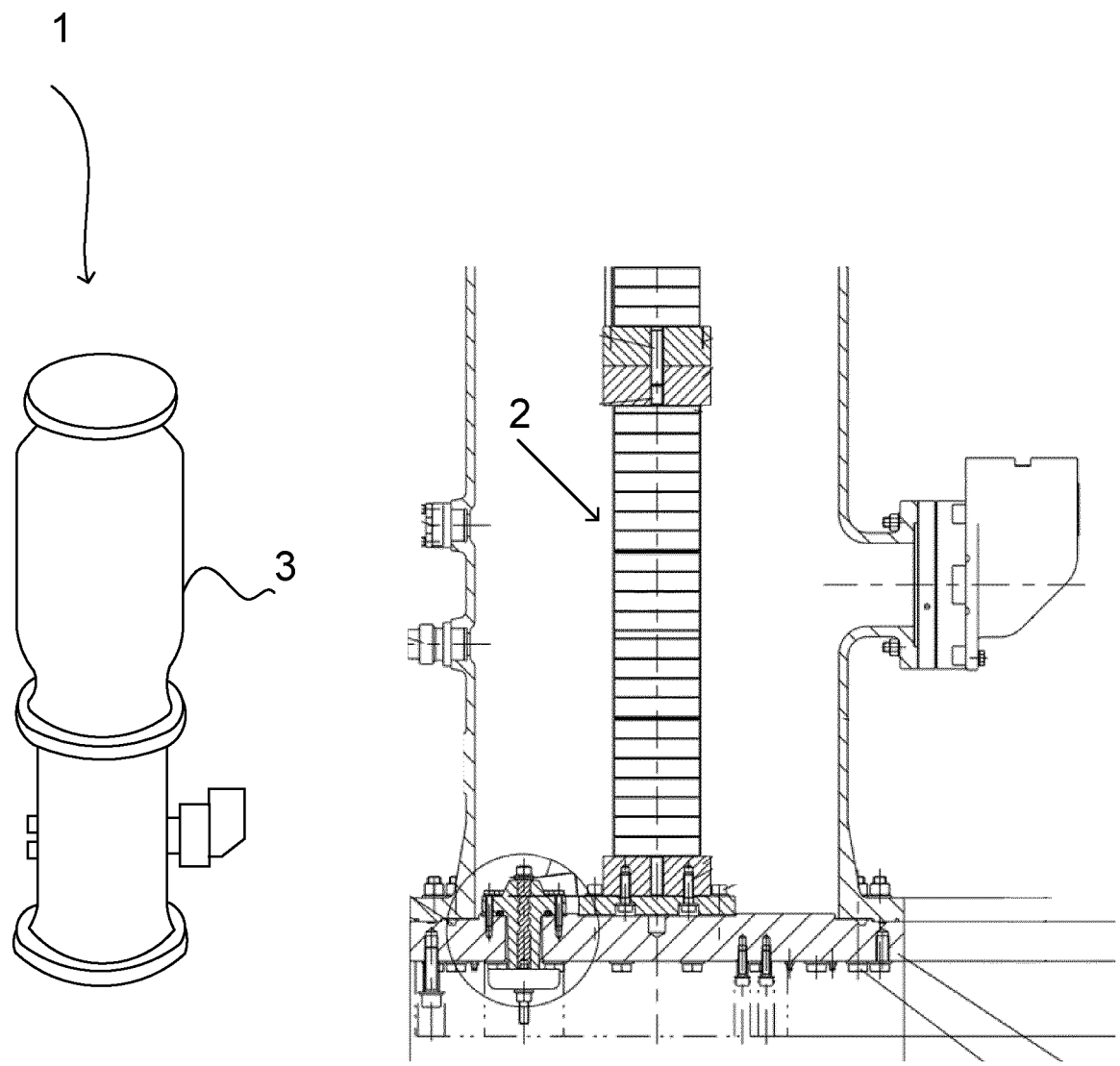
FIG. 1 illustrates a GIS surge arrester 1.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The applicant of this application has developed two surge arrester monitoring systems type EXCOUNT-II and EXCOUNT-III, available on the market. These surge arrester monitoring systems enable e.g., recording of number of discharges seen by the surge arrester as well as their amplitude (with timestamp), measurements of the total leakage current and resistive current through the surge arrester. One version of EXCOUNT-III can also measure surge impulse steepness, which is additional value adding information to the user. A valuable diagnostic analysis of the AIS surge arrester's performance and state of health over time can thereby be performed based on the output data.

However, these existing surge arrester monitoring systems are only for use in AIS applications. They incorporate a field probe for providing the necessary input for compensation so that an estimation of a resistive component of the leakage current can be made for the purpose of meaningful condition monitoring. The field probe needs to be mounted at the base of the surge arrester with the possibility to detect surrounding electric field, which presents no difficulties as the enclosure thereof is not metallic.

The present invention provides means for enabling input for compensation for GIS surge arresters as well, as will be described in various embodiments herein. The use of the existing surge arrester monitoring systems may thereby be used also for GIS surge arresters, and hence condition monitoring thereof.

In order to provide a thorough understanding of the present invention, some more details on surge arresters and related measurements are given in the following. As mentioned earlier, measurement of total leakage current is commonly used on all types of surge arresters, including GIS. The total leakage current of a metal-oxide (MO) surge arrester can be divided into capacitive and resistive parts, with a predominant capacitive component and a significantly smaller resistive part. The total leakage current is unsuitable for surge arrester diagnostic purposes and it is recognized that only the resistive component of the leakage current is a sensitive indicator of any changes in the voltage-current characteristic of the MO surge arrester.

The MO surge arrester has non-linear voltage-current characteristic which gives rise to harmonics in the total leakage current when it is energized with a sinusoidal voltage. The harmonic content of the total leakage current can be used as an indicator of the resistive leakage current. Using harmonics for measuring the resistive leakage current is advantageous compared to other methods, since no voltage reference is needed in order to determine the resistive part of the total leakage current. The third order harmonic is of special interest in this respect, since it has the largest magnitude of the current harmonics.

Another source of harmonics in the total leakage current is the harmonic content in the voltage of a system to which the arrester is connected and arranged to protect. The system voltage harmonics produce capacitive harmonic currents in the MO surge arrester. The capacitive harmonic currents produced by the system voltage harmonics may be of the same order of magnitude as the harmonic currents generated by the non-linear resistive leakage current. This means that the third harmonic content originating from the system voltage interferes with the third harmonic content associated with the resistive leakage current of the MO surge arrester. In order to perform accurate measurements of the resistive leakage current by means of third order harmonic analysis, it may be necessary to compensate for the third order harmonic content in the system voltage.

The compensation is performed by simultaneous measurements of both the total leakage current of the MO surge arrester and the current induced in a capacitive element, the latter being configured to provide a proportional value relative to the harmonic content in the system voltage.

FIG. 1 illustrates a GIS surge arrester 1. The GIS surge arrester 1 comprises one or more columns of MO resistors, which are serially connected and shown in a cross-sectional view at the right-hand side of FIG. 1. The MO resistor column 2 constitute an active part of the GIS surge arrester 1 and handles any surges that may occur. The one or more MO resistor columns 2 are arranged within a metal clad housing 3. The metal clad housing 3 of the GIS surge arrester 1 is filled with a pressurized dielectric gas, typically sulfur hexafluoride gas ($SF_6$ gas), as insulating medium.

In contrast to an AIS application, wherein the electric field generated by a MO resistor column can be measured from outside the surge arrester, the metal clad housing 3 of the surge arrester 1 does permit any electrical field to be captured externally. The present invention addresses this difficulty. In order to perform diagnostic measurements on the condition of the GIS surge arrester 1, and in particular the MO resistor column 2, it may be necessary to gain direct access to the MO resistor column 2 inside the metal clad housing 3 and then bring the required measurement signal outside. This can, according to various embodiments of the invention, be done in different ways, as will be described next.

Figure 2:
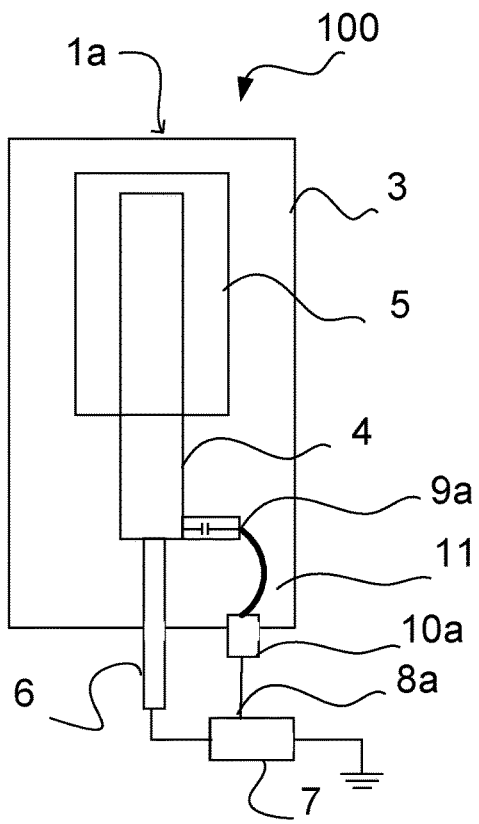
FIG. 2 illustrates a first embodiment of the present invention.

A monitoring system 100 is provided comprising a GIS surge arrester 1a and a monitoring arrangement 7 connected to it, as exemplified in FIGS. 2-5. The monitoring arrangement 7 may, for instance, EXCOUNT-II and EXCOUNT-III monitoring devices, developed by and available from the applicant of the present application. FIG. 2 illustrates a first embodiment of the present invention. The GIS surge arrester 1a is shown schematically, comprising a metal clad housing 3 and a surge arrester block stack 4, in the following denoted simply block stack 4, comprising one or more MO resistor column(s) 2 (not shown in detail). Further, a grading hood 5 may be arranged on the block stack 4, e.g., for ensuring linear voltage distribution along the block stack 4. Depending on the particular design and voltage at hand it may be omitted and/or have any other design than the one illustrated. An earthing bushing 6 is connected from the block stack 4 to a surge arrester monitoring device 7, which may, for instance, be one or both of the earlier mentioned EXCOUNT-II or EXCOUNT-III monitoring devices. The surge arrester monitoring device 7 connected to the GIS surge arrester 1a constitute a GIS surge arrester monitoring system 100.

In this embodiment, an internal capacitive element 9a is fitted in or to an end cap or end flange of the MO resistor column(s) of the surge arrester block stack 4 within the metal clad housing 3. The capacitive element 9a may, for instance, be embodied in the form of a capacitive tap, a capacitive graded bushing with a tap or a metal field probe. It is noted that the capacitive element 9a may be arranged elsewhere than at the base of the MO resistor column(s) 2. The capacitive element 9a may be placed at the high voltage end, in particular in embodiments without a grading hood 5. The capacitive element 9a enables extraction of the capacitive component in the leakage current. The capacitive element 9a may, for instance, comprise a metallic plate or other sensor device for measuring electric field, for instance micro-electro-mechanical systems (MEMS) or it may be a capacitive test tap. The capacitance of the capacitive element 9a is selected in dependence on the particular surge arrester 2, for instance in view of its voltage rating, self-capacitance, leakage current or electric field strength.

An internal electrical connection 11 is made from the capacitive element 9a to a bushing 10a for GIS applications. The bushing 10a then enables the signal to be brought outside of the metal clad housing 3. The bushing 10a should be designed in view of the properties of the particular surge arrester 1a at hand. For instance, the size of the bushing 10a should be selected to fit in a gastight manner, an electrical insulation and isolation should also be selected in view of the particular surge arrester 1a and its properties. An outside connection 8a, comprising e.g., an electrical conductor, is connected from the GIS bushing 10a to the surge arrester monitoring device 7. The connection 8a may thereby provide an input signal for a field probe input of the surge arrester monitoring device 7. The outside connection 8a may be connected to the surge arrester monitoring device 7 via a plug, bushing or other intermediate connection device (not shown).

Figure 3:
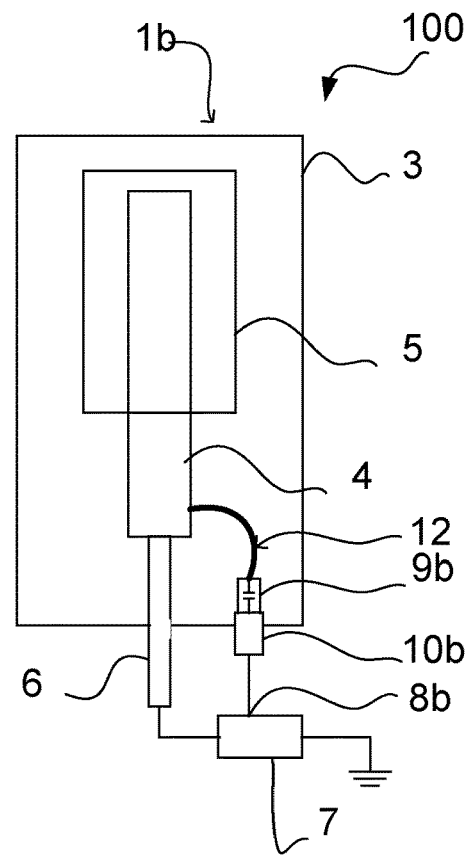
FIG. 3 illustrates a second embodiment of the present invention.

FIG. 3 illustrates a second embodiment of the present invention. The metal clad housing 3, the block stack 4, earthing bushing 6 and the grading hood 5 have been described in relation to the previous figure and will not be repeated here. In this embodiment, a capacitive element 9b is fitted to a bushing 10b, instead of to the MO resistor column(s) 2 as in the previous embodiment. An internal electrical connection 12 is then made from the MO resistor column(s) of the block stack 4 to the capacitive tap 9b fitted to the bushing 10b. The capacitive element 9b may be installed to the bushing 10b in different ways, for instance threaded or as plug in. As in the previous embodiment, this embodiment also comprises an outside connection 8b from the bushing 10b to the field probe input of the surge arrester monitoring device 7. The outside connection 8b described in relation to the previous embodiment may be used also in this embodiment for providing an input signal for a field probe input of the surge arrester monitoring device 7.

In the above embodiments, the capacitive element 9a, 9b is fitted in or to the end cap or end flange of the MO resistor column(s) 2 or to a bushing 10b. That is, the capacitive elements 9a, 9b are arranged internal of the metal clad housing 3. Below, an embodiment is described, wherein a capacitive element is instead embodied as an external capacitive tap, while the bushing is internal and arranged within the metal clad housing 3.

Figure 4:
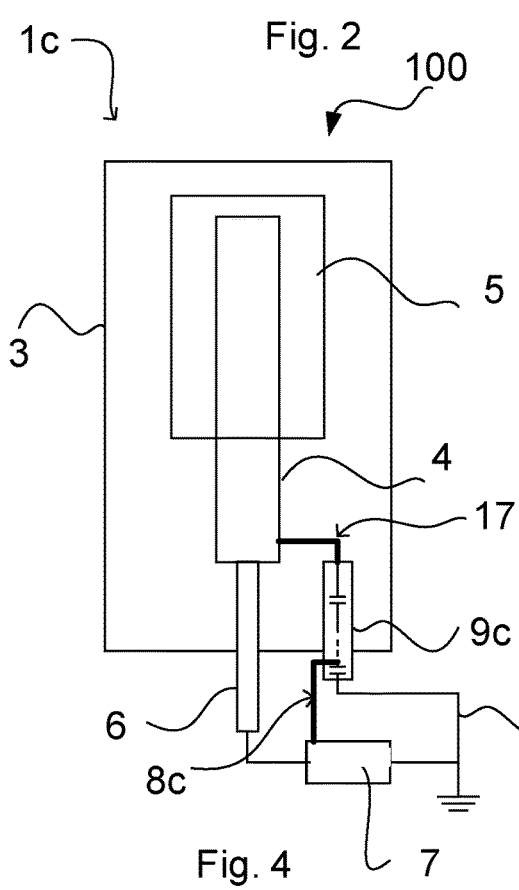
FIG. 4 illustrates a third embodiment of the present invention.

FIG. 4 illustrates a third embodiment of the present invention. Again, the metal clad housing 3, the block stack 4, earthing bushing 6 and the grading hood 5 have been described in relation to the previous embodiments and will not be repeated here. In order to enable extraction of the capacitive component in the leakage current, a capacitive graded bushing 10c is electrically connected to the stack block 4, e.g., at a lower part thereof such as its base. This internal electrical connection may, for instance, be made by a direct connection or by a jumper connection. The bushing 10c, suitable for GIS applications, passes through to outside the metal clad housing 3. The bushing 10c comprises, on the outside thereof, a connection 8c, e.g., embodied as a capacitive test tap connection 8c, which has a suitably sized capacitive ratio. That is, the electrical and mechanical characteristics should be matched to the service conditions. The connection 8c, in particular the capacitive test tap connection 8c, provides the desired input signal to the field probe input of the surge arrester monitoring device 7, e.g., via a plug or bushing (not illustrated). A connection 14 should be made from the bushing 10c to earth. The connection 14 can be made directly to earth as shown in the FIG. 4. However, depending, for instance on, the particular circumstances at hand, such connection 14 may instead be indirect, e.g., connected through the monitoring device 7.

Figure 5:
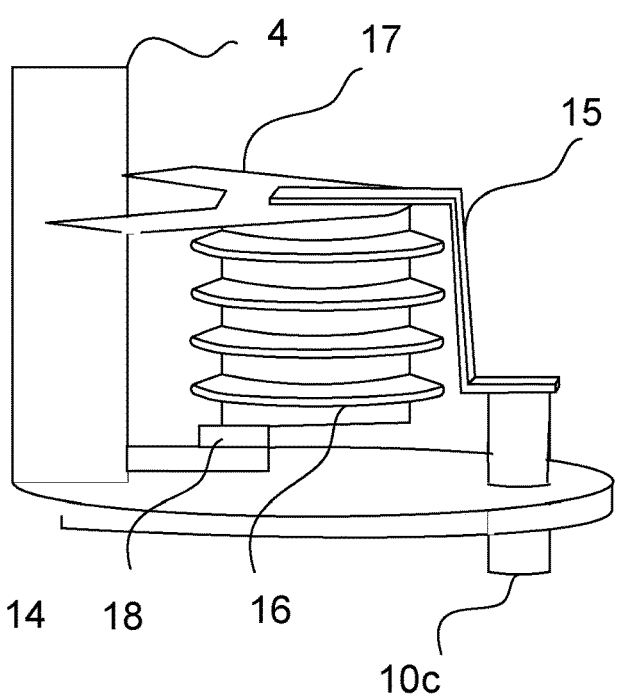
FIG. 5 illustrates an example capacitive element for use in embodiments of the invention.

FIG. 5 illustrates an example capacitive element suitable for use in the above embodiment. In the above embodiment of the invention, the bushing 10c is arranged through the metal clad housing 3 (not shown) of the surge arrester. The bushing 10c may, for instance, be a bushing for GIS applications. In order to obtain the measurement signal, a capacitive element in the form of a metal field probe plate 17 may for instance be used. The metal field probe plate 17 is arranged inside the metal clad housing 3 and arranged to perform measurements on the stack block 4, and in particular on the MO resistor column(s) thereof. The metal field probe plate 17 may be connected to the bushing 10c via a jumper connector 15 or the like. An insulator 16 should be arranged between the metal field probe plate 17 and a mounting plate 18. It is realized that these devices 15, 16, 17, and 18 may be designed differently and may be replaced with devices having the same functions. For instance, the insulator 16 is shown as having sheds, but in some embodiments the insulator 16 may be designed without sheds. It is noted that although a metal field probe plate 17 is used herein as an example on how the electric field may be measured, it is realized that various other methods and devices for measuring electric field are equally possible, e.g., MEMS sensors.

In order to gain the desired direct access to the MO resistor column 2 inside the metal clad housing 3 and then bring the required measurement signal outside, a field probe, e.g., the described capacitive elements, is provided, enabling the required measurement signal to be provided to a field probe input of the surge arrester monitoring device 7. The field probe can be embodied in different ways, as has been described.

A capacitive element, e.g., capacitive test tap or capacitive graded bushing with test tap) may be used as field probe for providing the necessary type of input, as well as be configured insulation and isolation. To this end, a commercially available capacitive test tap may be used. The test tap connected to the GIS surge arrester 1a, 1b, 1c will provide the necessary input to the surge arrester monitoring device 7 that in turn will allow it to perform a meaningful condition monitoring function not only on AIS arresters, but also on GIS arresters.

In various embodiments, a capacitive element 9a, 9b, 9c has been described, arranged to obtain an electric field measurement of the gas insulated surge arrester 1a, 1b, 1c. As noted earlier, such capacitive element may, for instance, be embodied in the form of a capacitive tap, a capacitive graded bushing with a test tap or a metal field probe. The electric field measurement may be a capacitive component in a leakage current of the surge arrester. Further, a bushing 10a, 10b, 10c has been described, in various embodiments, arranged through the metal clad housing 3 and arranged to provide the electric field measurement to a field probe input of a surge arrester monitoring device 7. The electric field measurement may be obtained by extracting a capacitive third-order harmonic component in a leakage current of the surge arrester 1a, 1b, 1c.

It is noted that although the various bushings 10a, 10b, 10c have been illustrated and described as being placed at the bottom of the metal tank beside the MO resistor columns, various other placements are also possible. For instance, the bushing may instead, in different embodiments, be placed such as to come out directly under the MO resistor column, on the side of the tank, or even at the top in an inverted mounted unit. The space in which the gas insulated surge arrester is to be placed for operation may be one consideration when designing and deciding the placement of the bushing.

As further design considerations, some additional insulation may be needed between the various metal contact surfaces of the different embodiments. The physical connections, placement and mechanical design needs may need to be tailored in view of the particular design of the GIS at hand. Given the teachings disclosed guidance given herein, the person skilled in the art would be able to make such considerations and particular design implementations.

The invention provides a condition monitoring of GIS surge arresters, by enabling the use of surge arrester diagnostic methods of third harmonic analysis of leakage current with compensation for harmonics in the voltage. The required input for the capacitive third harmonic current in the GIS surge arrester is enabled, whereby a compensation required in the diagnostic method can be performed. The resistive part of the total leakage current can be determined.

A monitoring system 100 is also provided, comprising a gas insulated surge arrester 1a, 1b, 1c as described in various embodiments. The monitoring system 100 further comprises a surge arrester monitoring device 7 connected to the gas insulated surge arrester 1a, 1b, 1c.

In some embodiments, the surge arrester monitoring device 7 comprises a surge arrester monitor enabling recording of the number of discharges seen by the surge arrester as well as their amplitude, and/or measurements of the total leakage current and resistive current through the surge arrester, and/or measurement of surge impulse steepness.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A gas insulated surge arrester comprising a metal clad housing within which a block stack is arranged, the block stack comprising at least one metal-oxide resistor column, the gas insulated surge arrester characterized by:
   a capacitive element arranged to obtain an electric field measurement of the gas insulated surge arrester, wherein the capacitive element is arranged to extract a capacitive third-order harmonic component in a leakage current of the surge arrester, and
   a bushing arranged through the metal clad housing and arranged to provide a capacitive third-order harmonic current measurement to an input of a surge arrester monitoring device.

2. The gas insulated surge arrester as claimed in claim 1, wherein the capacitive element is a capacitive tap.

3. The gas insulated surge arrester as claimed in claim 2, wherein the bushing comprises a first side and a second side, wherein the first side is arranged to the capacitive element and the second side is electrically connectable to the input of the surge arrester monitoring device.

4. The gas insulated surge arrester as claimed in claim 2, wherein the capacitive element comprises an internal capacitive element arranged within the metal clad housing.

5. The gas insulated surge arrester as claimed in claim 2, wherein the capacitive element comprises an external capacitive tap arranged on an outer side of the bushing.

6. The gas insulated surge arrester as claimed in claim 2, wherein the capacitive element comprises a metallic plate or a micro-electro-mechanical system sensor for measuring electric field.

7. The gas insulated surge arrester as claimed in claim 1, wherein an outer side of the bushing is electrically connected to the input of the surge arrester monitoring device by means of an electrical conductor.

8. A monitoring system comprising a gas insulated surge arrester as claimed in claim 1 connected to a surge arrester monitoring device.

9. The monitoring system as claimed in claim 8, wherein the surge arrester monitoring device comprises a surge arrester monitor enabling recording of number of discharges seen by the surge arrester as well as their amplitude, and/or measurements of the total leakage current and resistive current through the surge arrester, and/or measurement of surge impulse steepness.

10. A gas insulated surge arrester comprising a metal clad housing within which a block stack is arranged, the block stack comprising at least one metal-oxide resistor column, the gas insulated surge arrester further comprising:
   a capacitive element arranged to obtain an electric field measurement of the gas insulated surge arrester, wherein the capacitive element is arranged to extract a capacitive third-order harmonic component in a leakage current of the surge arrester,
   a bushing arranged through the metal clad housing and arranged to provide a capacitive third-order harmonic current measurement to an input of a surge arrester monitoring device.

11. The gas insulated surge arrester as claimed in claim 10, wherein the capacitive element is a capacitive tap.

12. The gas insulated surge arrester as claimed in claim 10, wherein the bushing comprises a first side and a second side, wherein the first side is arranged to the capacitive element and the second side is electrically connectable to the input of the surge arrester monitoring device.

13. The gas insulated surge arrester as claimed in claim 10, wherein the capacitive element comprises an internal capacitive element arranged within the metal clad housing.

14. The gas insulated surge arrester as claimed in claim 10, wherein the capacitive element comprises an external capacitive tap arranged on an outer side of the bushing.

15. The gas insulated surge arrester as claimed in claim 10, wherein the capacitive element comprises a metallic plate or a micro-electro-mechanical system sensor for measuring electric field.

16. The gas insulated surge arrester as claimed in claim 10, wherein an outer side of the bushing is electrically connected to the input of the surge arrester monitoring device by means of an electrical conductor.

17. A monitoring system comprising a gas insulated surge arrester as claimed in claim 10 connected to a surge arrester monitoring device.

18. The monitoring system of claim 17, wherein the surge arrester monitoring device comprises a surge arrester monitor enabling recording of number of discharges seen by the surge arrester as well as their amplitude, and/or measurements of the total leakage current and resistive current through the surge arrester, and/or measurement of surge impulse steepness.

* * * * *